United States Patent [19]

Shioyama et al.

[11] Patent Number: 4,662,330
[45] Date of Patent: May 5, 1987

[54] DIESEL ENGINE HAVING SWIRL CHAMBER AND SHAPED FLAME DISPERSING RECESS IN PISTON CROWN

[75] Inventors: Giichi Shioyama, Yokosuka; Kunihiko Sugihara, Tokyo; Yukihiro Etoh, Yokohama; Toshiaki Tanaka, Chigasaki; Yoshihisa Kawamura, Yokosuka, all of Japan

[73] Assignee: Nissan Motor Co., Ltd., Yokohama, Japan

[21] Appl. No.: 743,673

[22] Filed: Jun. 11, 1985

[30] Foreign Application Priority Data

Jun. 12, 1984 [JP] Japan .................................. 59-120108
Jun. 12, 1984 [JP] Japan .................................. 59-120109
Jun. 12, 1984 [JP] Japan .................................. 59-120110
Jul. 6, 1984 [JP] Japan ........................... 59-102312[U]

[51] Int. Cl.⁴ ............................................. F02B 19/08
[52] U.S. Cl. ..................................... 123/269; 123/262
[58] Field of Search ................. 123/269, 262, 290, 263

[56] References Cited

U.S. PATENT DOCUMENTS

| | | | |
|---|---|---|---|
| 2,935,054 | 5/1960 | Franke et al. | 123/263 |
| 3,965,872 | 6/1976 | Taira et al. | 123/269 |
| 4,005,684 | 2/1977 | Habu | 123/269 |
| 4,323,039 | 4/1982 | Tsugekawa et al. | 123/275 |
| 4,347,815 | 9/1982 | Schmidt | 123/269 |

FOREIGN PATENT DOCUMENTS

| | | | |
|---|---|---|---|
| 53-25709 | 3/1978 | Japan | 123/269 |
| 57-56618 | 4/1982 | Japan | 123/262 |
| 57-165626 | 10/1982 | Japan | 123/262 |

Primary Examiner—Andrew M. Dolinar
Attorney, Agent, or Firm—Schwartz, Jeffery, Schwaab, Mack, Blumenthal & Evans

[57] ABSTRACT

In order to promote a good flame dispersion within the combustion chamber of a swirl chamber type Diesel engine, a shaped recess formed in the piston crown is arranged to have a trench portion into which the flame from the swirl chamber is injected and mirror image flame dispersion portions on either side of the trench which terminates at the periphery of the piston crown. This arrangement inhibits the formation of secondary flame flows which tend impede desirable patterns within the flame disportion portions and simultaneously enlarges the dispersion area. In addition, careful selection of the dimensions of the transfer port which interconnects the swirl chamber and the main combustion chamber, and the various sections of the shaped recess, promotes further reductions in HC and smoke emissions.

8 Claims, 17 Drawing Figures

DIESEL ENGINE HAVING SWIRL CHAMBER AND SHAPED FLAME DISPERSING RECESS IN PISTON CROWN

BACKGROUND OF THE PRESENT INVENTION

1. Field of the Invention

The present invention relates generally to a Diesel engine and more specifically to high speed Diesel engine which features a swirl chamber and a recess formed in the piston crown which promotes good flame dispersion under all modes of engine operation.

2. Description of the Prior Art

Figure 1:
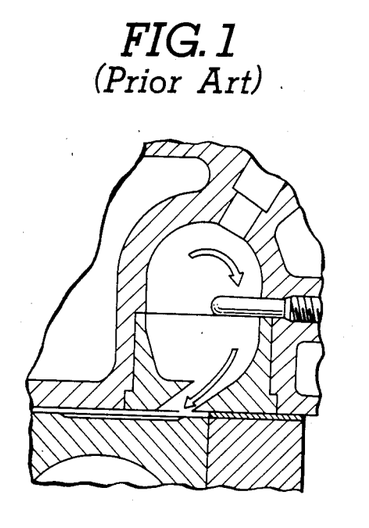
FIG. 1 is a sectional elevation of a prior art arrangement discussed in the opening paragraphs of the instant disclosure.
Figure 2:
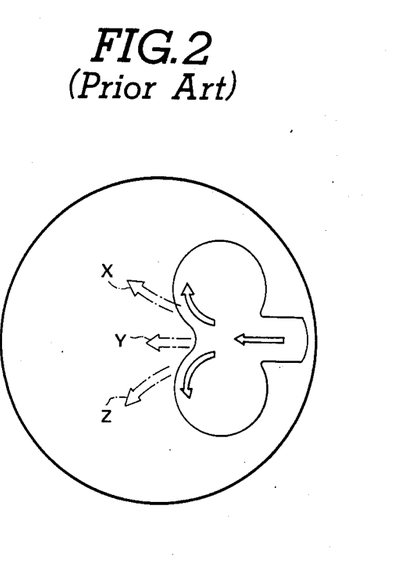
FIG. 2 is a plan view showing the "clover leaf" shaped recess formed in the crown of the piston shown in FIG. 1.

In order to improve the combustion characteristics of high speed Diesel engines it has been proposed to provide a swirl chamber and "clover leaf" shaped recess arrangement of the nature shown in FIGS. 1 and 2 (disclosed in Japanese Utility Model Application First Provisional Publication No. Sho 57-78724). This arrangement while meeting with some success has suffered from the drawback that in order to improve smoke and HC emissions it is desirable to enlarge the size of the swirl chamber so as to increase the amount of air which is initially mixed with the injected fuel. However, this measure decreases the compression ratio of the engine and lowers the temperature to which the charge is raised during the compression phase. This tends to increase the amount of HC contained in the engine exhaust and thus obivate the advantage derived by enlarging the swirl chamber.

In order to overcome this problem it has been proposed in to reduce the capacity of the cavity formed in the crown of the piston and thus raise the compression ratio. However, this results in the area of the flame dispersion sections of the "clover leaf" cavity being overly reduced (see FIG. 2 by way of example) leading to insufficient flame dispersion.

It has been subsequently suggested in Japanese Utility Model Application No. Sho 57-189037 to utilize the diffusion areas in place of the normal valve (inlet and exhaust) recesses so as to permit the enlargement of the flame dispersement areas while maintaining a desirably high compression ratio.

However, even with this arrangement still the volume of the cavity formed defined in the main combustion chamber tends to be overly large and thus has not improved the performance characteristics of the engine to any particular extent.

Further, the prior art has suffered from the drawback that if the dimensions of the transfer port and "clover leaf" recess are selected so that desirable flame propagation characteristics are obtained at low engine load operation, upon entering high load operation the velocity and therefore the kinetic energy of the flame ejected from the swirl chamber tends to be excessive and the flame rather than following the desired flow indicated by the solid line arrows in FIG. 2 tends to flow over the edge of the recess as shown by phantom arrows "X", "Y" and "Z". Under these conditions the flame tends to encounter relatively cold surfaces such as the cylinder bore wall and inevitably is quenched. This of course promotes the emission of HC.

SUMMARY OF THE INVENTION

It is an object of the present invention to provide a swirl chamber type Diesel engine which incudes a modified "clover leaf" type recess in the piston crown which promotes desirable flame dispersion, suppresses the formation of flow patterns within the flame dispersion areas which tend to impeded those which promote good mixing of the flame with the air in the main combustion chamber, and which is sufficiently low in volume as to permit the development of the desired compression ratio during the compression phase.

In brief, the above object is achieved by an arrangement wherein in order to promote good flame dispersion within the combustion chamber of a swirl chamber type Diesel engine, a shaped recess formed in the piston crown is arranged to have a trench portion into which the flame from the swirl chamber is injected and mirror image flame dispersion portions on either side of the trench which lead from the trench and terminate at the periphery of the piston crown. This arrangement inhibits the formation of secondary flame flows which tend impede desirable combustion promoting patterns within the flame dispersion portions and simultaneously enlarges the dispersion area. In addition, carefull selection of the dimensions of the transfer port which interconnects the swirl chamber and the main combustion chamber, and the various sections of the shaped recess, enables further reductions in HC and smoke emissions.

More specifically, the present invention comes in the form of an internal combustion engine which features: a cylinder bore having a wall; a piston having a crown, the piston being reciprocatively disposed in the cylinder bore in a manner to define a variable volume combustion chamber; a swirl chamber into which fuel is injected; a transfer port fluidly interconnecting the combustion chamber and the swirl chamber, the transfer port being arranged to introduce a charge compressed in the combustion chamber into the swirl chamber during a compression phase of the engine in a manner that the charge swirls within the combustion chamber; a shaped recess formed in the crown of the piston which includes: an elongated trench portion which is arranged with respect to the transfer port so that a first end thereof is located to receive a flame which is ejected from the swirl chamber during the expansion phase of the engine, first and second flame dispersion portions which extend from either side of the trench portion and which terminate at the periphery of the piston, and a curved wall portion formed at a second end of the trench portion and against which the flame which is ejected from the swirl chamber into the trench portion strikes and is divided into first and second primary flows which tend to swirl in the first and second flame dispersion portions respectively, the first and second flame dispersion portions being arranged to lead secondary flows, which are induced during descent of the piston and which tend to impede the swirling of the primary flows, in a manner to cause same to collide with the wall of the cylinder bore.

BRIEF DESCRIPTION OF THE DRAWINGS

The features and advantages of the arrangement of the present invention will become more clearly appreciated from the following description taken in conjunction with the accompanying drawings in which:

FIGS. 8 to 13C show in graphica form the various emission characteristics obtained via the variation of the various dimensions of the transfer passage and sections of the flame dispersing recess arrangement formed in the crown of the piston.

DETAILED DESCRIPTION OF THE PREFERRED EMBODIMENTS

FIGS. 3 to 7 show a first embodiment of the present invention. In this arrangement an internal combustion engine (Diesel) generally denoted by the numeral 10 includes a cylinder block 12 formed with a cylinder bore 14 and a cylinder head 16 which is detachably secured to the cylinder block 12. The cylinder head 16 is formed with a cavity 18. This cavity is closed by a suitable plug member 20 in which a transfer passage passage 22 is formed. As shown, the inboard surface of the plug 20 is shaped so as to define a swirl chamber 24 within the cavity 18.

Figure 3:
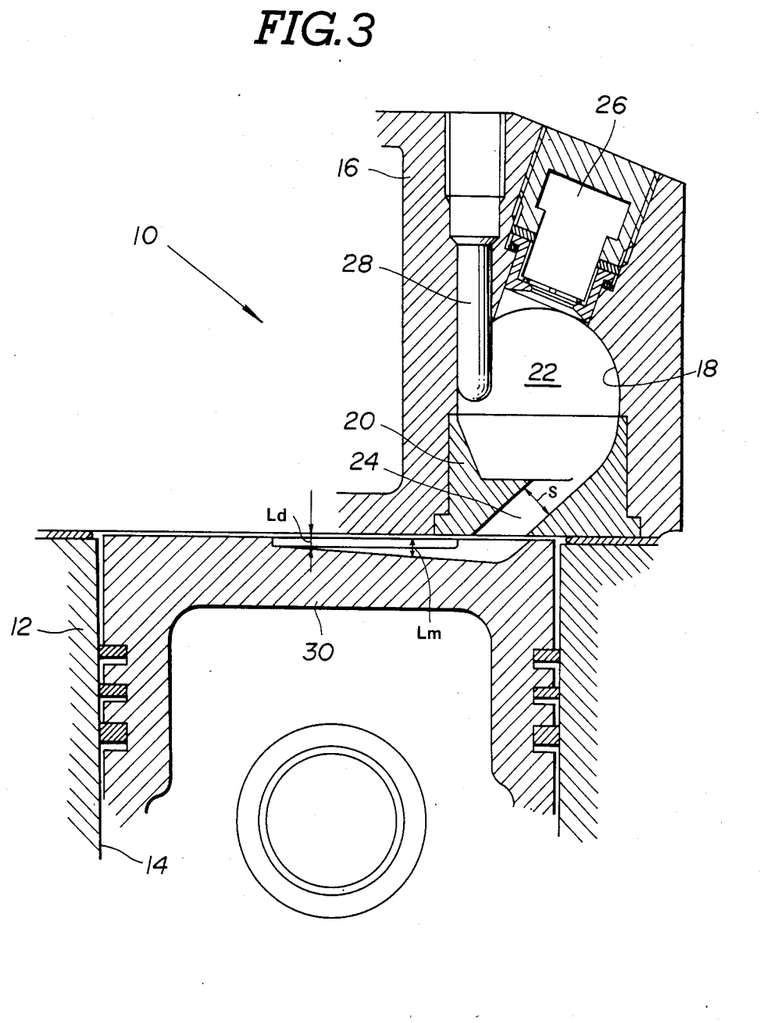
FIG. 3 is a sectional elevation of a first embodiment of the present invention.

The transfer passage 22 is arranged to introduce the charge compressed in the main combustion chamber tangentially into the swirl chamber 22 in manner which induces a swirling air pattern therein. Fuel is injected into the swirl chamber by a fuel injector 26.

Projecting into the swirl chamber is a grow plug 28 which in this embodiment is arranged to proximate the path along which the fuel is injected.

Reciprocatively disposed in the cylinder bore is a piston 30.

Figure 4:
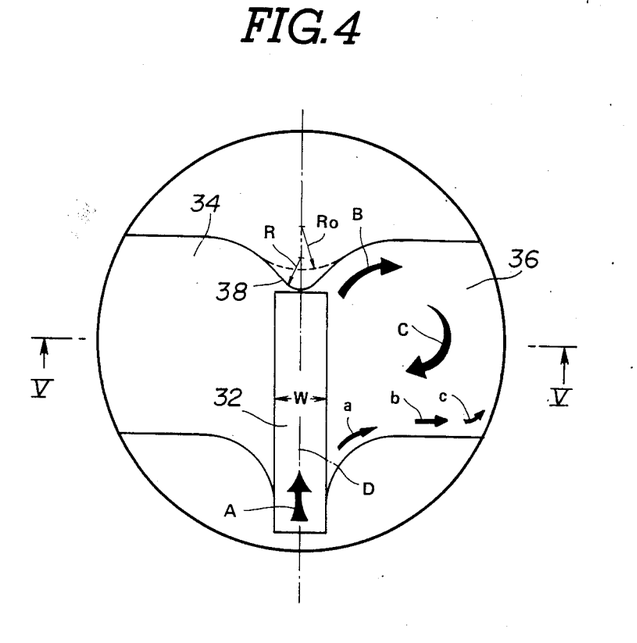
FIG. 4 is a plan view of the piston shown in FIG. 3 illustrating the flame dispersing arrangement which characterizes the arrangement of the present invention.
Figure 5:
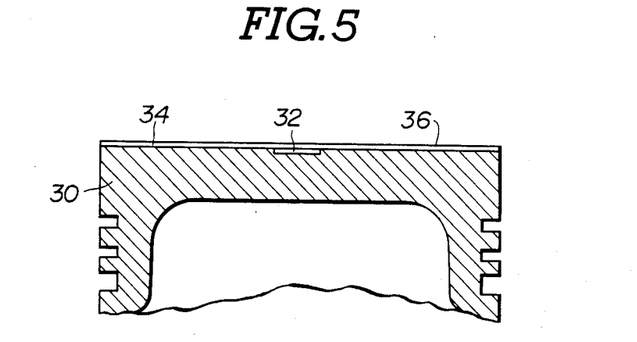
FIG. 5 is a sectional elevation of the piston shown in Fig. as taken along section line V—V of FIG. 4.
Figure 6:
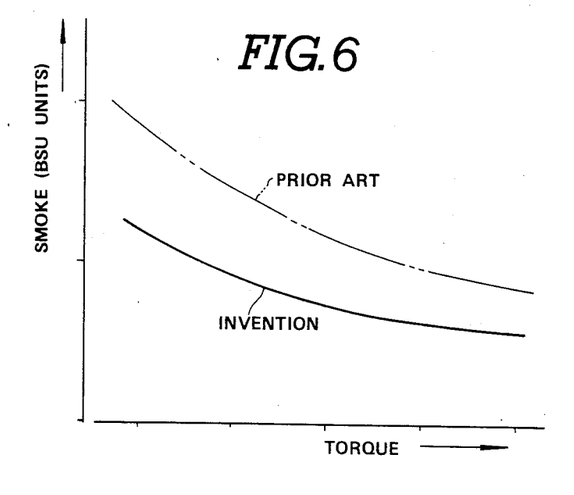
FIG. 6 is a graph showing in terms of smoke formation (BSU units) and engine load (torque measured at the ouput shaft of the engine) the performance characteristics of the prior art arrangement shown in FIGS. 1 and 2 and the those of the first embodiment of the present invention.

As best seen in FIGS. 4 and 5 the crown of the piston is formed with a shaped flame dispersing recess arrangement which, according to the present invention, takes the form of an elongate trench section 32 flanked by relatively shallow flame dispersing sections 34, 36. The dispersing portions or sections 34, 36 extend all the way to the perimeter of the piston and are arranged to be located beneath the inlet and exhaust valves (not shown) of the cylinder. The dispersing portions are larger in area than the valves they are located beneath.

As will be apparent from FIGS. 4 and 5 the longitudinal axis of the tench section 32 is essentially co-incident with a diameter "D" of the piston.

As shown in FIG. 3, the trench section is arranged to have a maximum depth at a first end which is located proximate the mouth of the transfer port 24 and to gradually taper to assume a shallower configuration at a second end which is distal from that into which the flame which is ejected from the swirl chamber 22 during the expansion phase of the engine. The depth of the second end is essentially equal to that of the shallow flame diffusion portions or sections 34, 36.

The flame dispersing portions 34, 36 are arranged to define a smooth nose-like portion 38 at the second (downstream) end of the trench 32 which divides the flame flowing therealong into first and second primary flows. In FIG. 4 only one of the primary flows is shown for simplicity. This flow is denoted by the large black arrows "B" and "C".

With the arrangement thus far disclosed, after the air/fuel mixture formed in the swirl chamber during the compression phase of the engine undergoes spontaneous combustion, a flame rich in hydrocarbon fuel is jetted via the transfer pot 24 into the first end of the trench portion 32. This flame as shown by arrow "A" flows rapidly alon the trench 32 until it strikes against the nose-like projection 38 which splits it into the above mentioned first and second primary flows. Subsequently, the primary flows tend to curl as shown by arrows B and C and thus tend to undergo swirling motion which blends the flame with the oxygen containing charge (air) in the main combustion chamber.

According to the present invention, as the flame dispersing portions 34, 36 extend to the very perimeter of the piston crown, the secondary flows of flame which sometimes tend to occur (indicated by small block arrows a, b and c) under the influence of the reverse squish phenomenon produced as the piston 30 descends from TDC, are permitted to flow to the edge of the piston crown and collide against the bore wall. This robs the secondary flows of a substantial amount of kinetic energy which in combination with the absence of the guiding effect of the normally provided sections of the clover leaf configured flame dispersion arrangement obviates the tendancy for the primary and secondary flows to collide in a manner which tends to interrupt the desirable swirl pattern which blends the oxygen rich air charge with the flame rich in combustible hydrocarbon.

It should be noted that although some quenching of the secondary flows tends to occur at the cylinder bore wall, this undesirable effect is well offset by the increased area over which the flames may sweep and by the improved blending of the flame with the remaining charge.

The above disclosed construction forms the basis of the present invention.

However, as the flame dispersing portions are relatively shallow so as to maintain a suitably low recess volume, it is advantageous to carefully select the dimensions of the trench portion etc., so as to achieve a further increases in combustion characteristics. For example, it is important to control the kinetic energy of the flame which is ejected into the trench and which subsequently collides against the flame splitting nose portion 38 so as to prevent the flame from flowing over the nose section in a manner illustrated by the phantom arrows X, Y and Z in FIG. 2, (which as previously disclosed tends to induce marked quenching and the formation of large amounts of HC).

In order to achieve the above control it is advantageous according to the present invention to design the engine so that width and cross sectional area of the transfer port 24 is such that:

$$S/Ld \leq 50 \tag{1}$$

wherein:

S represents the cross sectional area of the transfer port; and

Ld is the depth of the flame dispersion sections and such that:

$$W/W_{th} < 2 \quad (2)$$

wherein:

W represents the width of the trench portion; and

Figure 7:
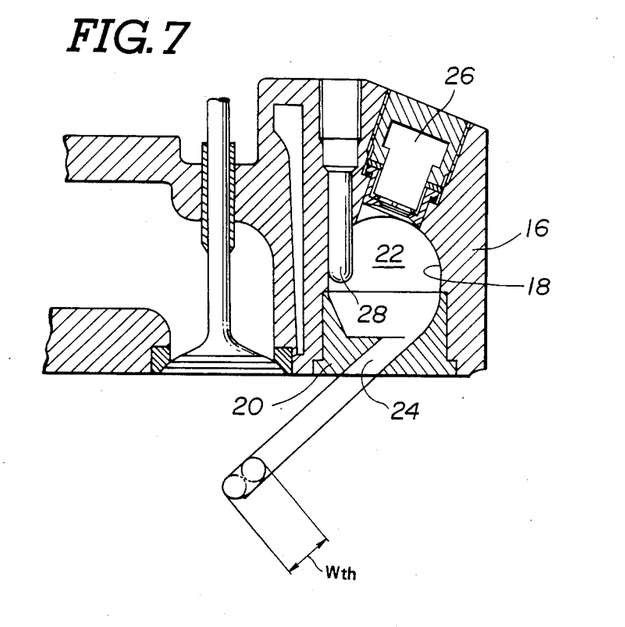
FIG. 7 is a sectional elevation of the first embodiment of the present invention showing the width of the transfer port which interconnects the swirl chamber and the variable volume combustion chamber.

Wth denotes the width of the transfer port (see FIG. 7).

Figure 11:
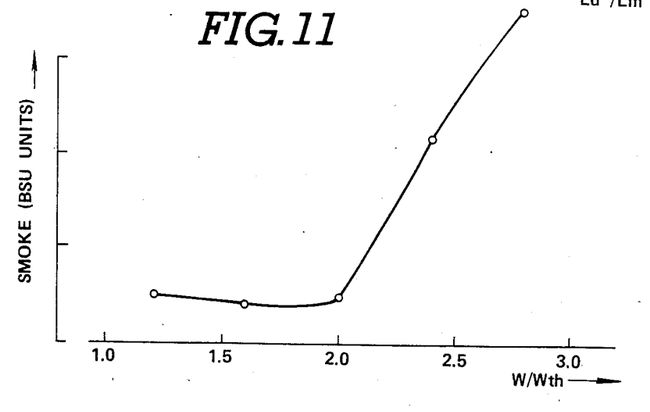
Figure 12A:
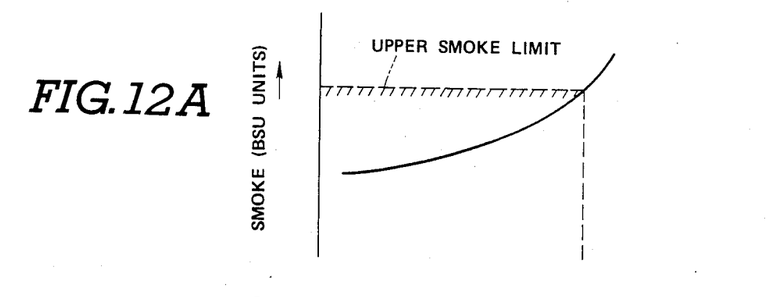
Figure 12B:
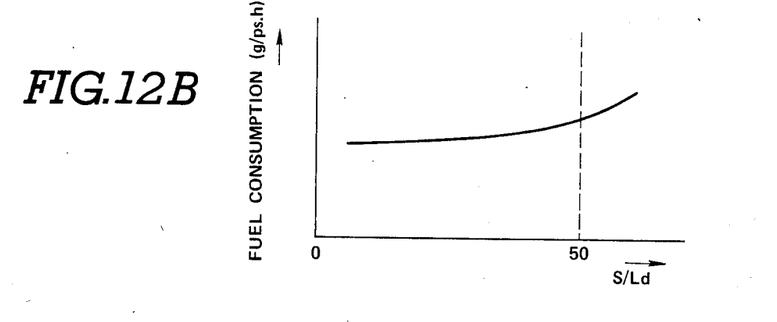

The improvements derivable using the above design limitations may be observed in the graphs of FIGS. 11, 12A and 12B. Viz., as will be appreciated from FIG. 11, until the ratio of W/Wth reaches a value of approximately 2.0 smoke formation remains at a relatively low level and then suddenly increases at a rapid rate as the ratio exceeds 2. On the other hand, FIGS. 12A and 12B show that until the ratio of S/Ld reaches a value of 50 the formation of smoke remains below the maximum allowable limit while the fuel consumption remains approximately constant.

A further measure for reducing noxious emission comes in careful selection of the depths of the trench portion and the flame diffusion areas. Viz., if the relationship is maintained $$Ld^2/Lm > 0.2 \quad (3)$$

wherein:

Ld represents the depth of the flame dispersion areas; and

Figure 10:
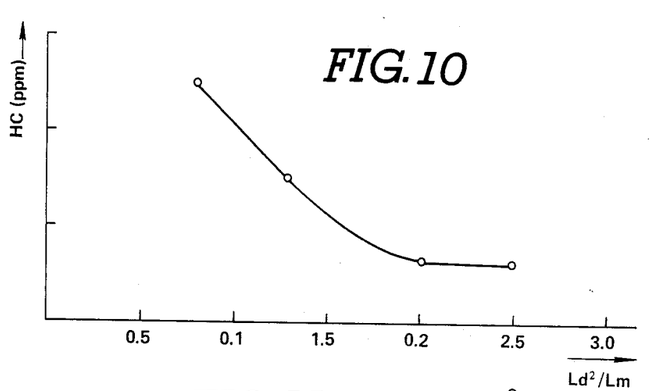

Lm represents the average depth of the trench section then as shown in FIG. 10 the amount of HC contained in the engine exhaust can be notably reduced.

Figure 8:
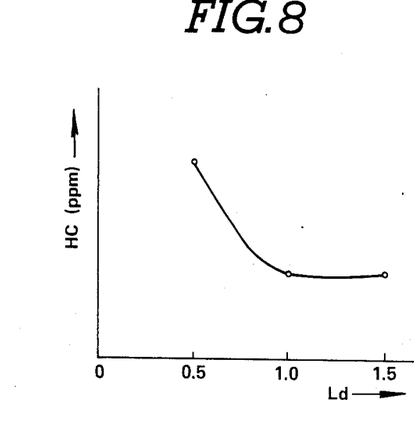
Figure 9:
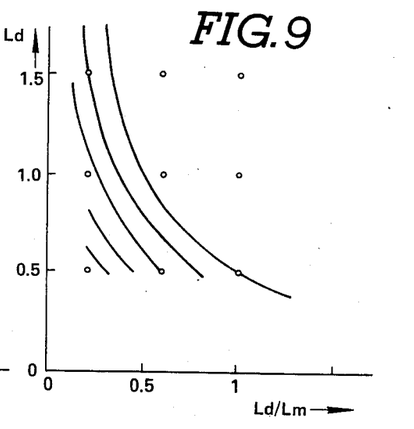

Further as will be apparent from FIGS. 8 and 9, if the value of Ld is insufficient the flame tends to ride over the rounded nose portion and undergo quenching, while if the value of Ld/Lm is insufficient the effect of the reverse squish causes excessive spreading of the flame which invites increased HC formation (it being noted that the traces shown in FIG. 9 represent equal concentrations of HC).

A further parameter which effects the combustion characteristics of the engine is the dimensions of the rounded flame splitting nose portion located at the downstream end of the trench. If this section is too blunt the flame tends to undergo insufficient "splitting" and thus tend to ride up over same.

Experiments have revealed that if the radius of the nose section with respect to the width of the trench falls within the following relationship:

$$R/W \leq 1 \quad (4)$$

wherein:

R is the radius of the nose section; and

Figure 13A:
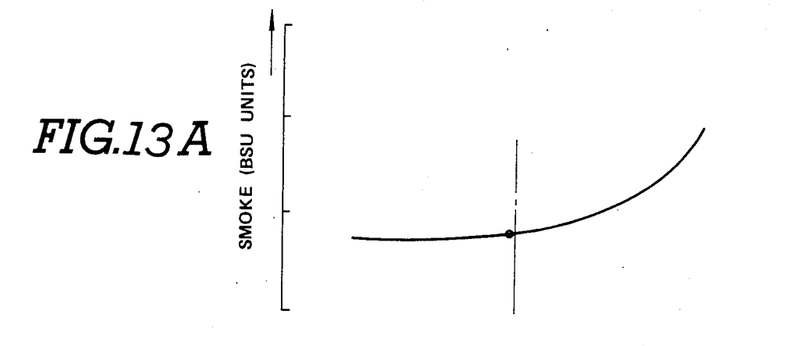
Figure 13B:
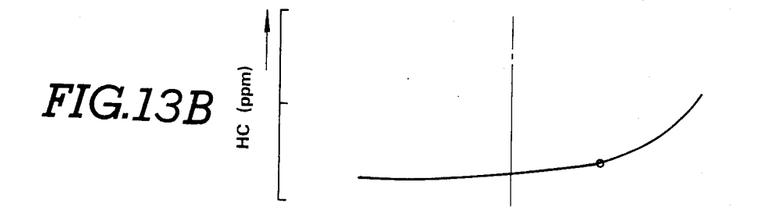
Figure 13C:
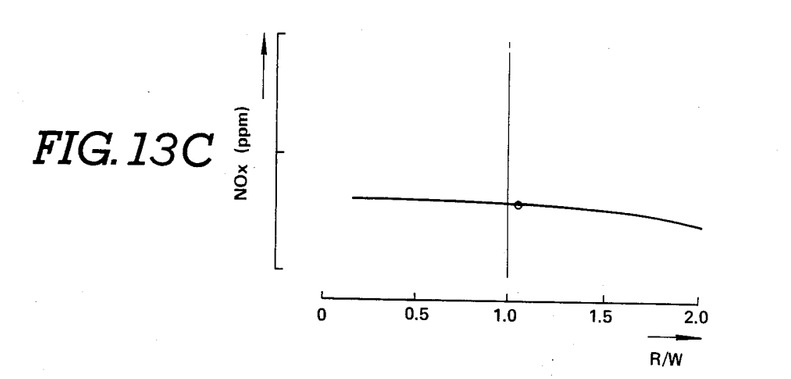

W is the width of the trench then suitable flame splitting occurs and the flame is broken into the primary flows in a manner wherein the kinetic energy thereof is maximized and not lost via a collision with an overly flat surface. This promotes good blending between the flame and the air contained in the main combustion chamber. Accordingly, as shown in FIGS. 13A to 13C, if the above mentioned ratio is maintained at or below 1 then it is possible to simultaneously produce acceptably small amounts of smoke, HC and NOx.

It will be noted that in FIG. 4, Ro denotes a radius which for the illustrated trench width produces a ratio of R/W which is equal to 1. Viz., the nose portion denoted by the broken line has the minimum acceptable curvature.

Figure 14:
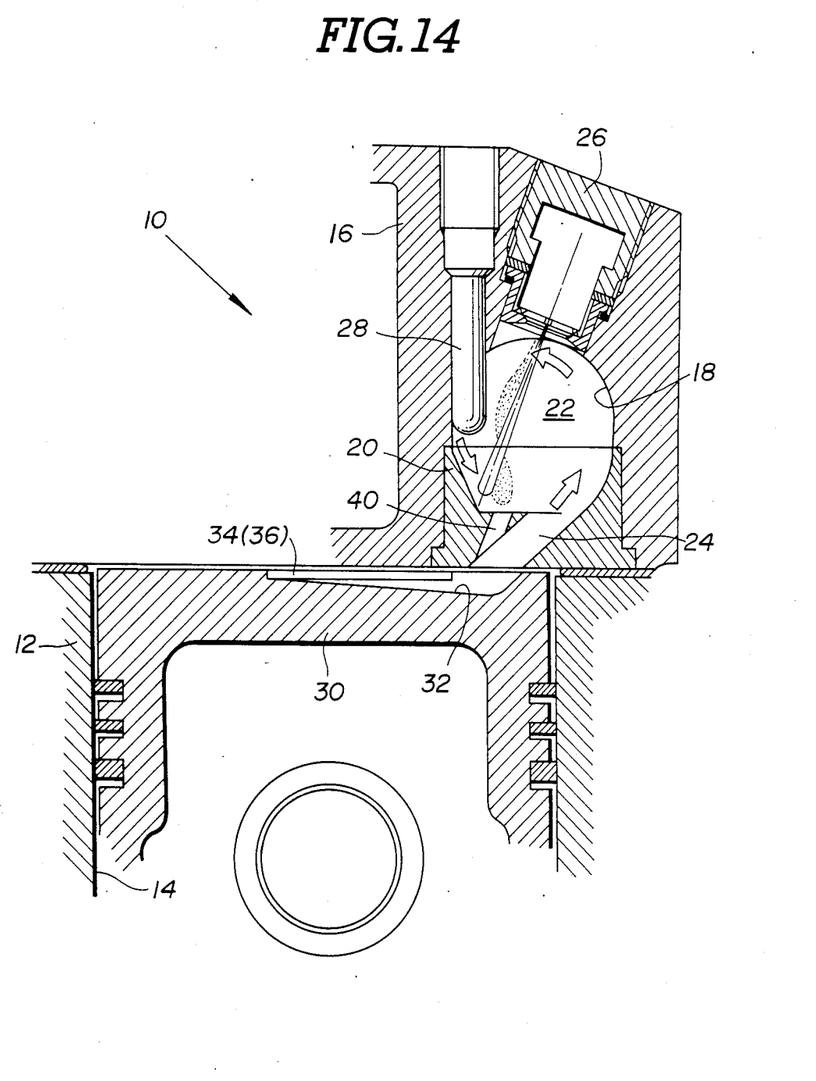
FIG. 14 shows a second embodiment of the present invention.

FIG. 14 shows a second embodiment of the present invention. This embodiment differs from the first one in that an auxiliary transfer passage 40 is provided in addition to the main transfer passage 24. In this arrangement the auxiliary transfer passage 40 is arranged so as to be located slightly downstream of the axis (with respect to the direction of swirl in the swirl chamber 22) so that, as illustrated, the swirl entrains the peripheral highly atomized fuel during injection and carries same toward the mouth of the auxiliary transfer port 40. Accordingly, a portion of the fuel injected into the swirl chamber by fuel injector 26 tends to enter the main combustion chamber (in particular the flame dispersing recess arrangement) in a highly carburretted state.

With this arrangement the amount of fuel retained in the swirl chamber is reduced thus increasing the air/fuel ratio desirably and simultaneously provides a highly combustible mixture in the main combustion chamber. Hence, upon spontontaneous combustion occuring in the swirl chamber 22 the peak combustion temperature is lowered and the combustion in the main combustion chamber promoted by the presence of the highly carburretted air-fuel mixture. For further disclosure relating to this type of arrangement reference should be had to copending U.S. patent application Ser. No. 428,227 filed on Sept. 29, 1982 in the name of Toshiaki Tanaka, the content of which is hereby incorporated by reference thereto.

What is claimed is:

1. In an internal combustion engine
   a cylinder bore having a wall;
   a piston having a crown, said piston being reciprocatively disposed in said bore in a manner to define a variable volume chamber therein;
   a swirl chamber into which fuel is injected;
   a transfer port fluidly interconnecting said combustion chamber and said swirl chamber, said transfer port being arranged to introduce a charge compressed in said combustion chamber into said swirl chamber during a compression phase of said engine in a manner that the charge swirls within said combustion chamber;
   a shaped recess formed in the crown of said piston, said shaped recess comprising:
   an elongated trench portion, said trench portion being arranged with respect to said transfer port so that a first end thereof is located to receive a flame which is ejected from said swirl chamber during the expansion phase of said engine;
   first and second essentially uniformly shallow flame dispersion portions which extend from either side of said trench portion and which extend completely to the periphery of said piston;
   means for dividing essentially all of the flame which is initially ejected into said trench portion into first and second primary flows and guiding said first and second primary flows to swirl in said first and second flame dispersion portions respectively, said dividing means taking the form of a curved wall section formed immediately at a second end of said trench portion opposite said first end and against which the flame which is ejected from said swirl chamber into said trench portion strikes and is divided into said first and second primary flows; and means embodied in the arrangement of said first and second flame dispersion portions for leading secondary flows, which are induced during descent of said piston, in a manner to cause same to collide with the wall of said cylinder bore and for attenuating the tendency for the secondary flows to collide with and impede the swirling of said primary flows.

2. An internal combustion engine as claimed in claim 1, wherein the depth of the first end of said trench portion is greater than the second end of said trench portion and wherein the depth of said second end is essentially equal to the depth of said first and second flame dispersion portions.

3. An internal combustion engine as claimed in claim 1, further comprising:
 a fuel injector, said fuel injector being arranged to inject fuel into said swirl chamber along a trajectory;
 an auxiliary transfer port formed in said swirl chamber, said auxiliary transfer port leading from said swirl chamber toward said combustion chamber, said auxiliary transfer port being arranged to open into said swirl chamber at a location downstream of said trajectory with respect to the direction that a charge forced into said swirl chamber during the compression phase of said engine swirls, so that a fraction of the fuel injected into said swirl chamber is permitted to enter said main combustion chamber in a highly carburetted state prior spontenous ignition of the air-fuel mixture formed in the swirl chamber.

4. An internal combustion engine as claimed in claim 1, wherein the ratio of the cross sectional area of said transfer port to the depth of said first and second flame dispersing portions is equal to or less than 50.

5. An internal combustion engine as claimed in claim 1, wherein the ratio of the width of said trench portion taken laterally thereacross to the width of said transfer port taken in a direction transverse with respect to said trench portion is greater than 2.

6. An internal combustion engine as claimed in claim 1, wherein the ratio of the square of the depth of said flame dispersion portions to the average depth of said trench portion is greater than 0.2.

7. An internal combustion engine as claimed in claim 1 wherein the ratio of the radius of said curved wall portion to the width of said trench portion is equal to or less than 1.

8. An internal combustion engine as claimed in claim 2, wherein the depth of said trench portion reduces continuously between said first and second ends.

* * * * *